(12) United States Patent
Kwon et al.

(10) Patent No.: US 10,385,218 B2
(45) Date of Patent: Aug. 20, 2019

(54) INSULATING COATING COMPOSITION FOR ORIENTED ELECTRICAL STEEL SHEET, ORIENTED ELECTRICAL STEEL SHEET HAVING INSULATING COATING FORMED ON SURFACE THEREOF BY USING SAME, AND PREPARATION METHOD THEREFOR

(71) Applicant: POSCO, Pohang-si, Gyeongsangbuk-do (KR)

(72) Inventors: Min Serk Kwon, Pohang-si (KR); Ho-Kyung Shim, Pohang-si (KR); Heon-Jo Choi, Pohang-si (KR); Byoung-Sub Choi, Pohang-si (KR)

(73) Assignee: POSCO, Pohang-si, Gyeongsangbuk-do (KR)

( * ) Notice: Subject to any disclaimer, the term of this patent is extended or adjusted under 35 U.S.C. 154(b) by 187 days.

(21) Appl. No.: 15/526,718

(22) PCT Filed: Dec. 4, 2014

(86) PCT No.: PCT/KR2014/011839
§ 371 (c)(1),
(2) Date: May 12, 2017

(87) PCT Pub. No.: WO2016/076471
PCT Pub. Date: May 19, 2016

(65) Prior Publication Data
US 2017/0313887 A1 Nov. 2, 2017

(30) Foreign Application Priority Data
Nov. 14, 2014 (KR) .................. 10-2014-0158758

(51) Int. Cl.
| | |
|---|---|
| *B05D 7/14* | (2006.01) |
| *C09D 1/00* | (2006.01) |
| *C09D 5/00* | (2006.01) |
| *C09D 7/40* | (2018.01) |
| *C09D 7/61* | (2018.01) |
| *C21D 6/00* | (2006.01) |
| *C21D 8/12* | (2006.01) |
| *C21D 9/46* | (2006.01) |
| *H01B 3/02* | (2006.01) |
| *C22C 38/02* | (2006.01) |
| *C22C 38/04* | (2006.01) |
| *C22C 38/06* | (2006.01) |
| *C23C 22/07* | (2006.01) |
| *C23C 22/82* | (2006.01) |

(52) U.S. Cl.
CPC .................. *C09D 1/00* (2013.01); *B05D 7/14* (2013.01); *C09D 5/00* (2013.01); *C09D 7/61* (2018.01); *C09D 7/70* (2018.01); *C21D 6/005* (2013.01); *C21D 6/008* (2013.01); *C21D 8/12* (2013.01); *C21D 8/1222* (2013.01); *C21D 8/1233* (2013.01); *C21D 8/1255* (2013.01); *C21D 8/1283* (2013.01); *C21D 9/46* (2013.01); *C22C 38/02* (2013.01); *C22C 38/04* (2013.01); *C22C 38/06* (2013.01); *C23C 22/07* (2013.01); *C23C 22/82* (2013.01); *H01B 3/02* (2013.01)

(58) Field of Classification Search
CPC ........................................................ H01B 3/02
See application file for complete search history.

(56) References Cited

U.S. PATENT DOCUMENTS

| | | | |
|---|---|---|---|
| 4,698,272 | A | 10/1987 | Inokuti et al. |
| 4,713,123 | A | 12/1987 | Inokuti et al. |
| 7,456,724 | B2 | 11/2008 | Mogi et al. |
| 2002/0012805 | A1 | 1/2002 | Mogi et al. |

(Continued)

FOREIGN PATENT DOCUMENTS

| | | |
|---|---|---|
| CN | 2696828 Y | 5/2005 |
| EP | 1903125 A1 | 3/2008 |
| EP | 2800103 A1 | 11/2014 |
| JP | 08-225900 A | 9/1996 |

(Continued)

OTHER PUBLICATIONS

Extended European Search Report in European Application No. 14905835.6, dated Sep. 21, 2017.

(Continued)

*Primary Examiner* — Peter F Godenschwager
(74) *Attorney, Agent, or Firm* — Morgan, Lewis & Bockius LLP

(57) ABSTRACT

Provided are an insulation coating composition for an oriented electrical steel sheet, an oriented electrical steel sheet having an insulation coating formed on the surface thereof by using the same, and a manufacturing method thereof, and specifically, it is possible to provide an insulation coating composition for an oriented electrical steel sheet, including 0.1 to 7 wt % of hollow nanoparticles, 0.1 to 5 wt % of ceramic nanofibers, 0.1 to 5 wt % of mesoporous nanoparticles, 30 to 60 wt % of colloidal silica nanoparticles, and 30 to 60 wt % of phosphate, and to provide an oriented electrical steel sheet including an insulation coating produced by the composition on the surface of the oriented electrical steel sheet, including 0.005 to 0.05 wt % of any one element selected from boron (B), vanadium (V), or a combination thereof, 2.6 to 4.3 wt % of silicon (Si), 0.020 to 0.040 wt % of aluminum (Al), 0.01 to 0.20 wt % of manganese (Mn), in which the balance is composed of Fe and other inevitable impurities, and a manufacturing method thereof.

8 Claims, 1 Drawing Sheet

(56) References Cited

U.S. PATENT DOCUMENTS

| | | | |
|---|---|---|---|
| 2005/0244322 A1* | 11/2005 | Chen | C01B 33/113 423/335 |
| 2009/0233114 A1 | 9/2009 | Takeda et al. | |
| 2016/0322138 A1* | 11/2016 | Han | C21D 9/46 |

FOREIGN PATENT DOCUMENTS

| | | |
|---|---|---|
| JP | H10-337755 A | 12/1998 |
| JP | 2001-181805 A | 7/2001 |
| JP | 2008-050676 A | 3/2008 |
| JP | 2012-031517 A | 2/2012 |
| JP | 2012-031519 A | 2/2012 |
| JP | 2014-095129 A | 5/2014 |
| KR | 10-1992-0007009 A | 4/1992 |
| KR | 10-1994-0006158 A | 3/1994 |
| KR | 2001-0104249 A | 11/2001 |
| KR | 10-2001-0109125 A | 12/2001 |
| KR | 10-2008-0010454 A | 1/2008 |
| KR | 10-2008-0106305 A | 12/2008 |
| KR | 10-2010-0053610 A | 5/2010 |
| KR | 10-2010-0091493 A | 8/2010 |
| KR | 10-2012-0073655 A | 7/2012 |
| KR | 10-2013-0010224 A | 1/2013 |
| KR | 10-2013-0020933 A | 3/2013 |
| KR | 10-2013-0025965 A | 3/2013 |
| KR | 10-2013-0035090 A | 4/2013 |
| KR | 10-2013-0055911 A | 5/2013 |
| KR | 10-2013-0055912 A | 5/2013 |
| KR | 10-2014-0088131 A | 7/2014 |

OTHER PUBLICATIONS

International Search Report dated Jul. 21, 2015 issued in International Patent Application No. PCT/KR2014/011839 (with English translation).

* cited by examiner

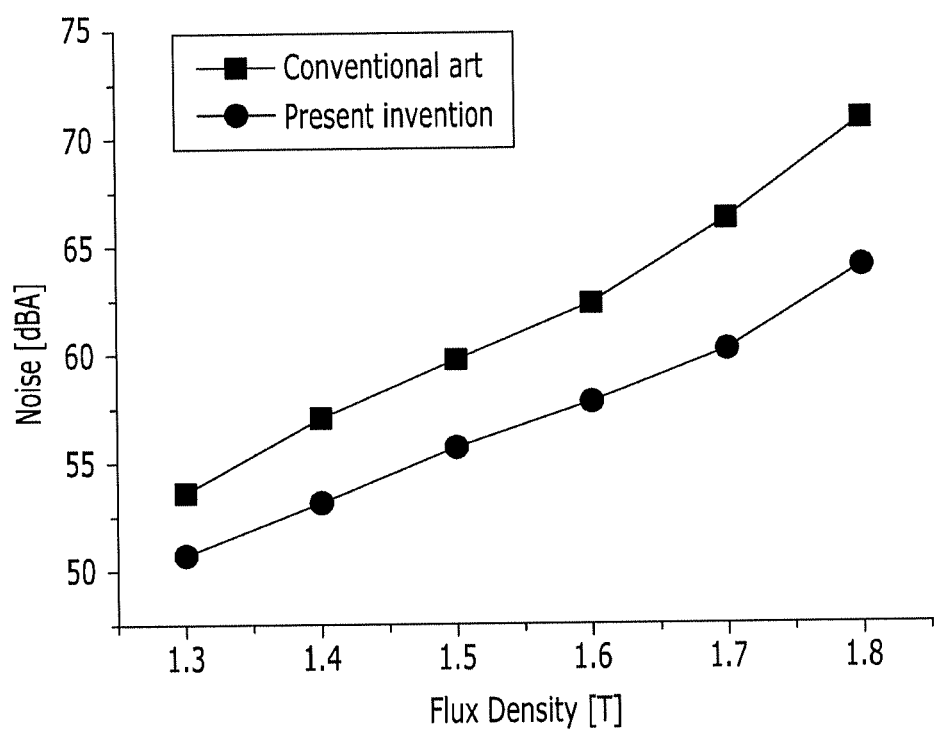

INSULATING COATING COMPOSITION FOR ORIENTED ELECTRICAL STEEL SHEET, ORIENTED ELECTRICAL STEEL SHEET HAVING INSULATING COATING FORMED ON SURFACE THEREOF BY USING SAME, AND PREPARATION METHOD THEREFOR

CROSS REFERENCE

This patent application is the U.S. National Phase under 35 U.S.C. § 371 of International Application No. PCT/KR2014/011839, filed on Dec. 4, 2014, which claims the benefit of Korean Patent Application No. 10-2014-0158758, filed on Nov. 14, 2014, the entire contents of each are hereby incorporated by reference.

TECHNICAL FIELD

The present invention relates to an insulation coating composition for an oriented electrical steel sheet, an oriented electrical steel sheet having an insulation coating formed on the surface thereof by using the same, and a manufacturing method thereof.

BACKGROUND ART

In general, an oriented electrical steel sheet contains approximately 3.1% of Si component in a steel sheet, and refers to an electrical steel sheet having extremely excellent magnetic characteristics in a rolling direction because the orientation of crystal grains has a texture arranged in a $\{100\}<001>$ direction.

The $\{100\}<001>$ texture can be obtained by a combination of various processes, and particularly, a series of processes of subjecting components including the components of a steel slab to heating, hot rolling, hot band annealing, primary recrystallization annealing, and final annealing need to be very strictly controlled.

Specifically, since the oriented electrical steel sheet suppresses the growth of primary recrystallized grains and exhibits excellent magnetic characteristics by means of a secondary recrystallized structure obtained by selectively growing crystal grains in a $\{100\}<001>$ orientation among the crystal grains whose the growth is suppressed, a primary recrystallized grain growth suppressing agent is more important. Moreover, in the final annealing process, it is one of the important matters in a technology of manufacturing an oriented electrical steel sheet to enable crystal grains, which stably have a texture in a $\{100\}<001>$ orientation among crystal grains whose growth is suppressed to be preferentially grown.

Examples of a primary recrystallized grain growth suppressing agent which may satisfy the aforementioned conditions and is currently and industrially widely used, include MnS, AlN, MnSe, and the like. Specifically, MnS, AlN, MnSe, and the like contained in a steel slab are subjected to a solid solution treatment by being reheated at high temperature for a long period of time, and then hot-rolled, and the components having an appropriate size and distribution in a subsequent cooling process are produced as a precipitate, and thus, may be used as the growth suppressing agent. However, there is a problem in that the steel slab needs to be heated at high temperature.

In this regard, recently, there has been an effort to improve magnetic characteristics of an oriented electrical steel sheet by a method for heating a steel slab at low temperature. For this purpose, a method for adding an antimony (Sb) element to the oriented electrical steel sheet has been proposed, but there has been pointed out a problem in that noise quality of a transformer deteriorates because the crystal grain sizes are irregular and coarse after the final high temperature annealing.

Meanwhile, in order to minimize the power loss of the oriented electrical steel sheet, an insulation coating is generally formed on the surface of the oriented electrical steel sheet, and in this case, the insulation coating basically needs to have high electrical insulating properties, excellent adhesion with materials, and a uniform color having no defects in the appearance. Along with the requirements, due to the recent strengthening of the international regulation on noise of a transformer and the fierce competition among the related industries, there is a need for studies on a magnetic deformation (magnetostriction) phenomenon in order to reduce the noise from an insulation coating of an oriented electrical steel sheet.

Specifically, when an electric field is applied to an electrical steel sheet used as a transformer core, a flicker phenomenon is caused by the repeated shrinkage and expansion, and vibration and noise are caused in a transformer due to the flicker.

In the case of a generally known oriented electrical steel sheet, effects of alleviating the iron loss and reducing the noise resulting from the magnetic deformation have been attempted by forming an insulation coating on a steel sheet and a forsterite-based base coating, and imparting the tensile stress to the steel sheet by using the difference in thermal expansion coefficients of the insulation coatings, but there is a limitation in satisfying a noise level recently required for a high oriented electrical steel sheet.

Meanwhile, as a method for reducing the 90° magnetic domain of an oriented electrical steel sheet, a wet coating method is known. Here, the 90° magnetic domain refers to a region having a magnetization oriented at a right angle with respect to a magnetic field application direction, and as the amount of 90° magnetic domain is decreased, the magnetic deformation is reduced. However, the general wet coating method has a problem in that a space factor and efficiency of a transformer deteriorate due to the disadvantages in that the effect of alleviating the noise by applying the tensile stress is insufficient, and a coating thickness needs to be thick.

In addition, as a method for imparting high tension characteristics to a surface of an oriented electrical steel sheet, a coating method through vacuum deposition such as a physical vapor deposition (PVD) method and a chemical vapor deposition (CVD) method has been known. However, the coating method has a problem in that it is difficult to apply the coating method to a commercial production, and an oriented electrical steel sheet manufactured by the method has degraded insulation characteristics.

DISCLOSURE

Technical Problem

Thus, the present inventors have been made in an effort to improve the problems of magnetic characteristics and magnetic deformation as pointed out above by subjecting an oriented electrical steel sheet including either or both of boron (B) and vanadium (V) to high temperature annealing.

Furthermore, the present inventors have been made in an effort to further improve the magnetic deformation problems as pointed out above by an insulation coating composition for an oriented electrical steel sheet, the insulation coating composition including hollow nanoparticles and mesoporous nanoparticles.

Specifically, an exemplary embodiment of the present invention may provide an insulation coating composition for an oriented electrical steel sheet, the insulation coating composition including 0.1 to 7 wt % of hollow nanoparticles, 0.1 to 5 wt % of ceramic nanofibers, 0.1 to 5 wt % of mesoporous nanoparticles, 30 to 60 wt % of colloidal silica nanoparticles, and 30 to 60 wt % of metal phosphate.

Another exemplary embodiment of the present invention may provide an oriented electrical steel sheet including: 0.005 to 0.05 wt % of any one element selected from boron (B), vanadium (V), or a combination thereof, 2.6 to 4.3 wt % of silicon (Si), 0.020 to 0.040 wt % of aluminum (Al), and 0.01 to 0.20 wt % of manganese (Mn), in which the balance is composed of Fe and other inevitable impurities, and an oriented electrical steel sheet having an insulation coating formed on the surface thereof by the composition.

Still another exemplary embodiment of the present invention may provide a method for manufacturing an oriented electrical steel sheet having an insulation coating formed on the surface thereof as described above.

Technical Solution

An exemplary embodiment of the present invention provides an insulation coating composition for an oriented electrical steel sheet, the insulation coating composition including 0.1 to 7 wt % of hollow nanoparticles; 0.1 to 5 wt % of ceramic nanofibers; 0.1 to 5 wt % of mesoporous nanoparticles; 30 to 60 wt % of colloidal silica nanoparticles; and 30 to 60 wt % of phosphate.

Specifically, the hollow nanoparticles will be described as follows.

The hollow nanoparticles may be composed of at least one or more oxides selected from the group consisting of $SiO_2$, $TiO_2$, $Al_2O_3$, and MgO.

The hollow nanoparticles may have a particle diameter of 50 to 300 nm.

The hollow nanoparticles may have an internal diameter of 30 to 280 nm.

Further, the ceramic nanofibers will be described as follows.

The hollow nanofibers may be composed of at least one or more oxides selected from the group consisting of $TiO_2$, $SiO_2$, $Al_2O_3$, $ZrO_2$, MgO, and $Li_4Ti_5O_{12}$.

The hollow nanoparticles may have a diameter of 5 to 100 nm.

Furthermore, the mesoporous nanoparticles will be described as follows.

The mesoporous nanoparticles may be composed of at least one or more oxides selected from the group consisting of $SiO_2$, $Al_2O_3$, MgO, and $TiO_2$.

The mesoporous nanoparticles may have a particle diameter of 1 to 800 nm.

The porosity of the mesoporous nanoparticles may include pores having 7 to 35 vol % based on the mesoporous nanoparticles.

The shape of the mesoporous nanoparticles may be any one shape selected from the group consisting of a spherical shape, a plate shape, and a needle shape.

In addition, the metal phosphate will be described as follows.

The metal phosphate may be composed of a compound produced by a chemical reaction of a metal hydroxide and phosphoric acid ($H_3PO_4$).

The metal phosphate may be composed of a compound produced by a chemical reaction of a metal hydroxide and phosphoric acid ($H_3PO_4$), and the metal hydroxide may be at least one selected from the group consisting of $Sr(OH)_2$, $Al(OH)_3$, $Mg(OH)_2$, $Zn(OH)_2$, $Fe(OH)_3$, and $Ca(OH)_2$.

Specifically, the metal phosphate may be composed of a compound produced by the chemical reaction of the metal hydroxide and phosphoric acid ($H_3PO_4$), and the metal element of the metal hydroxide may be formed by forming a single bond, a double bond, or a triple bond by a substitution reaction with phosphorus of phosphoric acid, and may be composed of a compound in which the amount of unreacted free phosphoric acid ($H_3PO_4$) is 30% or less.

The metal phosphate may be composed of a compound produced by a chemical reaction of a metal hydroxide and phosphoric acid ($H_3PO_4$), and the weight ratio of the metal hydroxide to the phosphoric acid may be represented as 1:100 to 30:100.

Another exemplary embodiment of the present invention provides an oriented electrical steel sheet having an insulation coating formed on the surface thereof, the oriented electrical steel sheet including: an oriented electrical steel sheet including 0.005 to 0.05 wt % of any one element selected from boron (B), vanadium (V), or a combination thereof, 2.6 to 4.3 wt % of silicon (Si), 0.020 to 0.040 wt % of aluminum (Al), and 0.01 to 0.20 wt % of manganese (Mn), in which the balance is composed of Fe and other inevitable impurities; and an insulation coating formed on the surface of the oriented electrical steel sheet, in which the insulation coating includes 0.1 to 7 wt % of hollow nanoparticles; 0.1 to 5 wt % of ceramic nanofibers; 0.1 to 5 wt % of mesoporous nanoparticles; 30 to 60 wt % of colloidal silica nanoparticles; and 30 to 60 wt % of phosphate.

In this case, a coating tension (A, MPA) of the oriented electrical steel sheet having an insulation coating formed on the surface thereof is a ratio of weight (B, $g/m^2$) of the insulation coating per area of the oriented electrical steel sheet, and may be represented as $0.20 \leq A/B \leq 2.50$ ($2 \leq B \leq 5$), specifically $0.63 \leq A/B \leq 1.17$ ($2 \leq B \leq 5$).

Furthermore, each component in the insulation coating will be described as follows.

The hollow nanoparticles may be composed of at least one or more oxides selected from the group consisting of $SiO_2$, $TiO_2$, $Al_2O_3$, and MgO.

The hollow nanoparticles may have a particle diameter of 50 to 300 nm.

The hollow nanoparticles may have an internal diameter of 30 to 280 nm.

The ceramic nanofibers may have a diameter of 5 to 100 nm.

The mesoporous nanoparticles may be composed of at least one or more oxides selected from the group consisting of $SiO_2$, $Al_2O_3$, MgO, and $TiO_2$.

The mesoporous nanoparticles may have a particle diameter of 1 to 800 nm.

The metal phosphate may be composed of a compound produced by a chemical reaction of a metal hydroxide and phosphoric acid ($H_3PO_4$).

Specifically, the metal phosphate may be composed of a compound produced by the chemical reaction of the metal hydroxide and phosphoric acid ($H_3PO_4$), and the metal element of the metal hydroxide may be formed by forming a single bond, a double bond, or a triple bond by a substitution reaction with phosphorus of phosphoric acid, and may be composed of a compound in which the amount of unreacted free phosphoric acid ($H_3PO_4$) is 30% or less.

Still another exemplary embodiment of the present invention provides a method for manufacturing an oriented electrical steel sheet having an insulation coating formed on the surface thereof, the method including: preparing an oriented electrical steel sheet including 0.005 to 0.05 wt % of any one element selected from boron (B), vanadium (V), or a combination thereof, 2.6 to 4.3 wt % of silicon (Si), 0.020 to 0.040 wt % of aluminum (Al), and 0.01 to 0.20 wt % of manganese (Mn), in which the balance is composed of Fe and other inevitable impurities; manufacturing an insulation coating composition for an oriented electrical steel sheet by mixing hollow nanoparticles, ceramic nanofibers, mesoporous nanoparticles, colloidal silica nanoparticles, and metal phosphate; applying the insulation coating composition for an oriented electrical steel sheet onto the surface of the oriented electrical steel sheet; subjecting the oriented electrical steel sheet in which the insulation coating composition for an oriented electrical steel sheet is applied onto the surface thereof to a heat treatment; and obtaining an oriented electrical steel sheet having an insulation coating formed on the surface thereof, in which the insulation coating composition for an oriented electrical steel sheet includes 0.1 to 7 wt % of hollow nanoparticles, 0.1 to 5 wt % of ceramic nanofibers, 0.1 to 5 wt % of mesoporous nanoparticles, 30 to 60 wt % of colloidal silica nanoparticles, and 30 to 60 wt % of metal phosphate.

In this case, the prepared oriented electrical steel sheet may have an average crystal grain size of 15 to 35 mm.

Further, the preparing of the oriented electrical steel sheet including 0.005 to 0.05 wt % of any one element selected from boron (B), vanadium (V), or a combination thereof, 2.6 to 4.3 wt % of silicon (Si), 0.020 to 0.040 wt % of aluminum (Al), and 0.01 to 0.20 wt % of manganese (Mn), in which the balance is composed of Fe and other inevitable impurities may include: preparing a steel slab; manufacturing a hot-rolled sheet by subjecting the steel slab to hot rolling; manufacturing a cold-rolled sheet by subjecting the hot-rolled sheet to cold rolling; obtaining a decarburization-annealed steel sheet by subjecting the cold-rolled sheet to decarburization annealing; and applying an annealing separator onto the decarburization-annealed steel sheet, and carrying out a final annealing.

Meanwhile, the manufacturing of the insulation coating composition for an oriented electrical steel sheet by mixing hollow nanoparticles, ceramic nanofibers, mesoporous nanoparticles, colloidal silica nanoparticles, and metal phosphate will be described as follows.

The mesoporous nanoparticles may be manufactured by including: introducing a pore former and a mesoporous nanoparticle precursor into an ethanol solvent, and mixing the resulting mixture; adjusting the pH to 10 to 12 by adding ammonia water into the mixed solution; heating the pH-adjusted solution; and obtaining nanoparticles in which nano-sized pores are formed.

The pore former may be at least one selected from the group consisting of poly(methyl methacrylate) (PMMA), polystyrene, poly(ethylene oxide), and polypropylene oxide).

The mesoporous nanoparticle precursor may be at least one selected from the group consisting of tetraethyl orthosilicate, tetramethyl orthosilicate, aluminum trialkoxide, magnesium alkoxide, and titanium tetraalkoxide.

The heating of the pH-adjusted solution may be carried out for 4 to 6 hours within a temperature range of 50 to 70° C.

Further, the metal phosphate may be manufactured by manufacturing an aqueous metal hydroxide solution; introducing phosphoric acid into the manufactured aqueous metal hydroxide solution and mixing the resulting mixture; stirring the mixed solution; and obtaining a compound produced by a chemical reaction of a metal hydroxide and phosphoric acid ($H_3PO_4$).

Meanwhile, the subjecting of the oriented electrical steel sheet, in which the insulation coating composition for an oriented electrical steel sheet is applied onto the surface thereof, to a heat treatment may be carried out within a temperature range of 250 to 950° C.

The subjecting of the oriented electrical steel sheet, in which the insulation coating composition for an oriented electrical steel sheet is applied onto the surface thereof, to a heat treatment may be carried out for 30 seconds to 70 seconds.

Advantageous Effects

An exemplary embodiment of the present invention may provide an insulation coating composition for an oriented electrical steel sheet, which is excellent in reducing noise resulting from magnetic deformation.

Another exemplary embodiment of the present invention may provide an oriented electrical steel sheet having an insulation coating formed on the surface thereof, which has an excellent noise reducing effect by the insulation coating while securing excellent magnetic characteristics by B or V in the oriented electrical steel sheet.

Still another exemplary embodiment of the present invention may provide an oriented electrical steel sheet having an insulation coating formed on the surface thereof, which has the characteristics.

DESCRIPTION OF THE DRAWINGS

FIG. 1 is a result of comparing noise characteristics of 1,500 kVA transformers according to Inventive Examples of the present invention and the Comparative Examples.

MODE FOR INVENTION

Hereinafter, exemplary embodiments of the present invention will be described in detail. However, the exemplary embodiments are suggested as an example, the present invention is not limited thereby, and the present invention is defined only by the scope of the claims to be described below.

An exemplary embodiment of the present invention provides an insulation coating composition for an oriented electrical steel sheet, the insulation coating composition including 0.1 to 7 wt % of hollow nanoparticles; 0.1 to 5 wt % of ceramic nanofibers; 0.1 to 5 wt % of mesoporous nanoparticles; 30 to 60 wt % of colloidal silica nanoparticles; and 30 to 60 wt % of metal phosphate.

The insulation coating composition is a coating agent which effectively reduces a vibration resulting from magnetic deformation, and corresponds to a composition which may be used for forming an insulation coating on the surface of an oriented electrical steel sheet.

Since the noise of the oriented electrical steel sheet is caused by the vibration resulting from the magnetic deformation, there is a method for reducing a 90° magnetic domain by imparting tensile stress to the steel sheet in order to alleviate the noise characteristics.

The insulation coating composition for an oriented electrical steel sheet, which is provided by an exemplary embodiment of the present invention may include hollow nanoparticles to resolve all of 1) a problem in that in the case of a wet coating method in the related art, an effect of alleviating noise by imparting tensile stress is insufficient, and a space factor and efficiency of a transformer deteriorate due to the coating having a large thickness, and 2) a problem in that it is difficult to achieve a commercial production according to the vacuum deposition coating method in the related art and insulation characteristics deteriorate.

Specifically, the hollow nanoparticles mean nanoparticles in the form that the inside is hollow, and the shell surrounding the hollow space is present. This form may be synthesized by using a polymer or an inorganic material as a raw material to synthesize nanoparticles, forming a shell on the surface thereof, and then selectively removing only nanoparticles present inside the shell.

Since there is a large hollow space inside the hollow nanoparticles as described above, the hollow nanoparticles may suppress the vibration from being amplified by converting vibration energy into heat energy when the magnetic deformation occurs, and thus are effective for alleviating noise of a transformer. Further, the hollow nanoparticles have an advantage in that the hollow nanoparticles are suitable for manufacturing a transformer due to the excellent heat resistance as an inorganic oxide and are easily mass-produced.

Accordingly, it is possible to solve the problems of causing the noise resulting from the magnetic deformation and degrading the coating compatibility by the hollow nanoparticles.

In this case, when only the hollow nanoparticles are used, it is likely to cause a problem in that the coating tension slightly deteriorates, but it is possible to compensate the problem by the ceramic nanofibers.

Furthermore, the mesoporous nanoparticles mean nanoparticles in the form that nano-sized pores are distributed on the surface thereof. In this regard, the nano porous materials are generally classified into microporous (the case of a pore size of 2 µm or less), mesoporous (the case of a pore size of 2 to 50 nm), and macroporous (the case of a pore size of 50 nm or more) depending on the size of the pores.

The form of mesoporous nanoparticles may be synthesized by mixing materials such as a polymer to manufacture nanoparticles, and removing only carbon components in the nanoparticles by a heat treatment to form nano-sized pores on the surface of the nanoparticles.

The mesoporous nanoparticles have advantages in that insulation characteristics of the insulation coating may be improved due to the large specific area and the presence of fine pores, the amount of composition applied may be reduced, such that the thickness of the insulation coating may be decreased, and the manufacturing costs may be reduced due to the improved insulation characteristics, and a space factor of a transformer may be improved.

Meanwhile, the hollow nanoparticles and the mesoporous nanoparticles are chemically bonded to each other, and as a result, the particle size may become irregular, and when the nanoparticles become aggregated in a lump, it is likely to cause a surface defect appearing as a spotted pattern and a poor coating adhesion. In this regard, it is possible to prevent a side reaction, which is likely to be caused, by including the metal phosphate.

The colloidal nanosilica has excellent compatibility with other additives due to the large specific area and excellent chemical reactivity, and in a heat treatment process after the coating, it is possible to obtain a product of which the surface is aesthetic and the surface roughness is excellent.

Hereinafter, the insulation coating composition for an oriented electrical steel sheet, which is provided by an exemplary embodiment of the present invention will be examined in detail.

First, the hollow nanoparticles will be described as follows.

The hollow nanoparticles may be composed of at least one or more oxides selected from the group consisting of $SiO_2$, $TiO_2$, $Al_2O_3$, and $MgO$.

The hollow nanoparticles may have a particle diameter of 50 to 300 nm. When the hollow nanoparticles have a particle diameter of less than 50 nm, the hollow nanoparticles are not suitable for mass production due to an increase in specific surface area and deterioration in stability of the composition, and when the hollow nanoparticles have a particle diameter of more than 300 nm, the surface roughness becomes rough, and as a result, a surface defect may occur, and accordingly, the particle diameter needs to be limited to the range.

The hollow nanoparticles may have an internal diameter of 30 to 280 nm. When the hollow nanoparticles have an internal diameter of less than 30 nm, there is a problem in that a vibration reduction function resulting from the magnetic deformation deteriorates. When the hollow nanoparticles have an internal diameter of more than 280 nm, there may occur a problem in that the hollow nanoparticles are easily destroyed when the hollow nanoparticles are processed while being applied to an oriented electrical steel sheet, and accordingly, the internal diameter needs to be limited to the range.

Meanwhile, the ceramic nanofibers will be described as follows.

The hollow nanofibers may be composed of at least one or more oxides selected from the group consisting of $TiO_2$, $SiO_2$, $Al_2O_3$, $ZrO_2$, $MgO$, and $Li_4Ti_5O_{12}$.

The ceramic nanofibers may have a diameter of 5 to 100 nm. When the ceramic nanofibers have a diameter of less than 5 nm, there is a problem in that the capability of the insulation coating formed by the composition, which imparts tension, deteriorates, and when the ceramic nanofibers have a diameter of more than 100 nm, there may occur a problem in that it is difficult to uniformly distribute the ceramic nanofibers in the composition, and accordingly, the diameter of the ceramic nanofibers needs to be limited to the range.

Further, the mesoporous nanoparticles will be described as follows.

The mesoporous nanoparticles may be composed of at least one or more oxides selected from the group consisting of $SiO_2$, $Al_2O_3$, $MgO$, and $TiO_2$.

The mesoporous nanoparticles may have a particle diameter of 1 to 800 nm. When the mesoporous nanoparticles have a particle diameter of less than 1 nm, the mesoporous nanoparticles are not suitable for mass production due to a sharp increase in manufacturing costs, and when the mesoporous nanoparticles have a particle diameter of more than 800 nm, there may occur a problem in that a space factor of a transformer is reduced because the surface roughness becomes rough, and accordingly, the particle diameter needs to be limited to the range.

The porosity of the mesoporous nanoparticles may include pores having 7 to 35 vol % based on the mesoporous nanoparticles. If the porosity is less than 7 vol %, there may occur a problem in that the effects of improving insulation characteristics is minimal, and if the porosity is more than 35 vol %, there may occur a problem in that it is difficult to distribute the mesoporous nanoparticles in the composition, and accordingly, the porosity needs to be limited to the range.

The shape of the mesoporous nanoparticles may be any one shape selected from the group consisting of a spherical shape, a plate shape, and a needle shape.

Furthermore, the metal phosphate will be described as follows.

The metal phosphate may be composed of a compound produced by a chemical reaction of a metal hydroxide and phosphoric acid ($H_3PO_4$).

The metal phosphate may be composed of a compound produced by a chemical reaction of a metal hydroxide and phosphoric acid ($H_3PO_4$), and the metal hydroxide may be at least one or more selected from the group consisting of $Sr(OH)_2$, $Al(OH)_3$, $Mg(OH)_2$, $Zn(OH)_2$, $Fe(OH)_3$, and $Ca(OH)_2$.

Specifically, the metal element of the metal hydroxide may be formed by forming a single bond, a double bond, or a triple bond by a substitution reaction with phosphorus of phosphoric acid, and may be composed of a compound in which the amount of unreacted free phosphoric acid ($H_3PO_4$) is 30% or less.

The metal phosphate may be composed of a compound produced by a chemical reaction of a metal hydroxide and phosphoric acid ($H_3PO_4$), and the weight ratio of the metal hydroxide to the phosphoric acid may be represented as 1:100 to 30:100.

If the metal hydroxide is included at a weight ratio of more than 30:100, there may occur a problem in that the precipitate is produced because the chemical reaction is not completely finished, and if the metal hydroxide is included at a weight ratio of less than 1:100, there may occur a problem in that the corrosion resistance deteriorates, and accordingly, the weight ratio needs to be limited to the range.

Another exemplary embodiment of the present invention provides an oriented electrical steel sheet having an insulation coating formed on the surface thereof, the oriented electrical steel sheet including: an oriented electrical steel sheet including 0.005 to 0.05 wt % of any one element selected from boron (B), vanadium (V), or a combination thereof, 2.6 to 4.3 wt % of silicon (Si), 0.020 to 0.040 wt % of aluminum (Al), and 0.01 to 0.20 wt % of manganese (Mn), in which the balance is composed of Fe and other inevitable impurities; and an insulation coating formed on the surface of the oriented electrical steel sheet, in which the insulation coating includes 0.1 to 7 wt % of hollow nanoparticles; 0.1 to 5 wt % of ceramic nanofibers; 0.1 to 5 wt % of mesoporous nanoparticles; 30 to 60 wt % of colloidal silica nanoparticles; and 30 to 60 wt % of phosphate.

The oriented electrical steel sheet corresponds to an oriented electrical steel sheet having an insulation coating formed on the surface thereof, which maintains excellent magnetic characteristics by including either or both of particularly, boron (B) and vanadium (V) in the composition of the oriented electrical steel sheet and may solve, by means of the insulation coating, both a problem in that the noise resulting from the magnetic deformation is caused and a problem in that the coating compatibility deteriorates.

Hereinafter, the oriented electrical steel sheet having an insulation coating formed on the surface thereof, which is provided by an exemplary embodiment of the present invention will be examined in more detail, and the features and advantages of each component included in the insulation coating for an oriented electrical steel sheet are as described above and will be omitted.

More specifically, the reason why the content of each element included in the prepared oriented electrical steel sheet is limited will be described as follows.

Any one element or elements selected from boron (B), vanadium (V), or a combination thereof: 0.005 to 0.05 wt %

Both the boron (B) and the vanadium (V) are a crystal grain boundary segregation element, and correspond to an element which interrupts the movement of the crystal grain boundary. Due to these characteristics, the elements promote a production of crystal grains in the {110}<001> orientation as a growth suppressing agent of crystal grains, and induce secondary recrystals to be developed well, and as a result, these elements may play an important role in controlling the size of the crystal grains.

If the content of any one element or elements selected from boron (B), vanadium (V), or a combination thereof is less than 0.005 wt %, it is difficult to serve as the suppressing agent, and when the content thereof is more than 0.05 wt %, the crystal grain boundary segregation severely occurs, and as a result, as the brittleness of the steel sheet is increased, the plate fracture occurs during the rolling. The disadvantages lead to the limitation of the range as described above.

Silicon (Si): 2.6 to 4.3 wt %

The silicon (Si) serves to decrease the iron loss by increasing the specific resistance of the steel sheet, and when the content thereof is less than 2.6 wt %, there is a problem in that the secondary recrystals become unstable because the iron loss characteristics deteriorate due to a decrease in resistivity of steel and a phase transformation interval is present during the high temperature annealing, and when the content thereof is more than 4.3 wt %, it is difficult to carry out cold rolling because the brittleness is increased. The disadvantages lead to the limitation of the range as described above.

Aluminum (Al): 0.020 to 0.040 wt %

The aluminum (Al) is a component which finally becomes a nitride in the form of AlN, (Al,Si)N, and (Al,Si,Mn)N, and thus, may serves as a suppressing agent, and when the content thereof is less than 0.020 wt %, which is an extremely small value, a sufficient effect as the suppressing agent as described above cannot be expected, and when the content thereof is more than 0.040 wt %, the nitride is extremely coarsely precipitated and grown, and as a result, an effect as a suppressing agent cannot be expected. The disadvantages lead to the limitation of the range as described above.

Manganese (Mn): 0.01 to 0.20 wt %

The manganese (Mn) is an element which plays a role similar to the silicon (Si), and has an effect of decreasing the iron loss by increasing the resistivity, and suppresses the growth of primary recrystallized grains by being reacted with nitrogen together with the silicon (Si) to form a precipitate of (Al,Si,Mn)N, and serves to play an important role in producing secondary recrystals therefrom.

However, when the content thereof is more than 0.20 wt %, an austenite phase transformation is promoted during the hot rolling, and as a result, there occurs a problem in that the size of primary recrystallized grains is decreased, and secondary recrystals become unstable therefrom. Thus, the content of the manganese (Mn) needs to be limited to 0.20 wt % or less.

Further, the manganese (Mn) is an element which forms austenite, and has effects of increasing the amount of solid solution of the precipitates by increasing the fraction of austenite during the hot rolling, making the precipitate fine-grained during the re-precipitation, and preventing primary recrystalizedl grains through the formation of MnS from being excessively increased. Accordingly, an appropriate content of 0.01 wt % or more needs to be included.

Meanwhile, since the noise of the oriented electrical steel sheet is caused by the vibration resulting from the magnetic deformation, there is a method for reducing the 90° magnetic domain by making the size of crystal grains fine after the steel sheet is annealed at high temperature in order to improve the noise characteristics. However, when a method for manufacturing an oriented electrical steel sheet, which is known in the related art, is used, the size of crystal grains is large and irregular, and as a result, an effect of improving the noise is insufficient. Thus, an insulation coating having the composition was introduced into the surface of the oriented electrical steel sheet.

Specifically, a coating tension (A, MPA) of the oriented electrical steel sheet having an insulation coating formed on the surface thereof is a ratio of weight (B, g/m$^2$) of the insulation coating per area of the oriented electrical steel sheet, and may be represented as $0.20 \leq A/B \leq 2.50$ ($2 \leq B \leq 5$), specifically $0.63 \leq A/B \leq 1.17$ ($2 \leq B \leq 5$).

Specifically, the coating tension represented by A is measured by applying an insulation coating composition onto the surface of the oriented electrical steel sheet and drying the insulation coating composition to manufacture a sample, compressing an anti-corrosion coated paper onto one surface of the sample, immersing the sample in an eluting solution, which is manufactured by mixing sodium hydroxide and water under a temperature condition of 90° C. for 20 seconds to remove the insulation coating on the one surface of the sample, drying the sample, and then observing the bending degree of the sample, the unit thereof is MPa, and when the relationship of the weight (B, g/m$^2$) of the insulation coating with an area of the oriented electrical steel sheet satisfies the range, the optimal conditions for noise, space factor, and insulation characteristics may be derived. These effects are supported by Examples to be described below.

The optimal conditions for noise, space factor, and insulation characteristics of the oriented electrical steel sheet may be derived by controlling the coating tension (A) and the weight (B) of the insulation coating as described above, and the optimal conditions are sufficiently supported by the Examples to be described below.

However, when the value of A/B is less than 0.20, insulation and noise characteristics of the oriented electrical steel sheet deteriorate, and thus it is insufficient to produce a product such as a transformer by using the oriented electrical steel sheet. Furthermore, when the value of A/B is more than 2.50, it becomes difficult to manufacture an efficient transformer because the space factor becomes low. Thus, the range of A/B is limited as described above.

Furthermore, the description on each component in the insulation coating is as follows, and the detailed description thereof is the same as that described above, and thus, will be omitted.

The hollow nanoparticles may be composed of at least one or more oxides selected from the group consisting of $SiO_2$, $TiO_2$, $Al_2O_3$, and $MgO$.

The hollow nanoparticles may have a particle diameter of 50 to 300 nm.

The hollow nanoparticles may have an internal diameter of 30 to 280 nm.

The ceramic nanofibers may have a diameter of 5 to 100 nm.

The mesoporous nanoparticles may be composed of at least one or more oxides selected from the group consisting of $SiO_2$, $Al_2O_3$, $MgO$, and $TiO_2$.

The mesoporous nanoparticles may have a particle diameter of 1 to 800 nm.

The metal phosphate may be composed of a compound produced by a chemical reaction of a metal hydroxide and phosphoric acid ($H_3PO_4$).

For the metal phosphate, the metal element of the metal hydroxide may be formed by forming a single bond, a double bond, or a triple bond by a substitution reaction with phosphorus of phosphoric acid, and may be composed of a compound in which the amount of unreacted free phosphoric acid ($H_3PO_4$) is 30% or less.

Still another exemplary embodiment of the present invention provides a method for manufacturing an oriented electrical steel sheet having an insulation coating formed on the surface thereof, the method including: preparing an oriented electrical steel sheet including 0.005 to 0.05 wt % of any one element selected from boron (B), vanadium (V), or a combination thereof, 2.6 to 4.3 wt % of silicon (Si), 0.020 to 0.040 wt % of aluminum (Al), and 0.01 to 0.20 wt % of manganese (Mn), in which the balance is composed of Fe and other inevitable impurities; manufacturing an insulation coating composition for an oriented electrical steel sheet by mixing hollow nanoparticles, ceramic nanofibers, mesoporous nanoparticles, colloidal silica nanoparticles, and metal phosphate; applying the insulation coating composition for an oriented electrical steel sheet onto the surface of the oriented electrical steel sheet; subjecting the oriented electrical steel sheet in which the insulation coating composition for an oriented electrical steel sheet is applied on the surface thereof to a heat treatment; and obtaining an oriented electrical steel sheet having an insulation coating formed on the surface thereof, in which the insulation coating composition for an oriented electrical steel sheet includes 0.1 to 7 wt % of hollow nanoparticles, 0.1 to 5 wt % of ceramic nanofibers, 0.1 to 5 wt % of mesoporous nanoparticles, 30 to 60 wt % of colloidal silica nanoparticles, and 30 to 60 wt % of metal phosphate.

The method corresponds to a method for manufacturing an oriented electrical steel sheet having an insulation coating formed on the surface thereof, which has the excellent characteristics previously described.

The features and advantages of the insulation coating composition for an oriented electrical steel sheet and the insulation coating are as described above and thus will be omitted, and the other matters will be described in detail.

Specifically, the prepared oriented electrical steel sheet may have an average crystal grain size of 15 to 35 mm.

The reason is because the oriented electrical steel sheet includes either or both of boron (B) and vanadium (V), the average crystal grain size is within the range in which the crystal grain size thereof is micronized as compared to the oriented electrical steel sheet which is commercialized in the related art, and excellent magnetic characteristics of the oriented electrical steel sheet may be achieved through the range.

Here, the reason why the average crystal grain size is limited after the high temperature annealing is because when the average crystal grain size is less than 15 mm, the magnetic flux density deteriorates, and accordingly, it is insufficient to produce a product such as a transformer by using the oriented electrical steel sheet. Further, when the average crystal grain size is more than 35 mm, there occurs a problem in that the magnetic deformation becomes severe.

Hereinafter, the method for manufacturing an oriented electrical steel sheet having an insulation coating from the composition according to an exemplary embodiment of the present invention will be described.

First, a steel slab including 0.005 to 0.05 wt % of any one element or elements selected from boron (B), vanadium (V), or a combination thereof, 2.6 to 4.3 wt % of silicon (Si), 0.020 to 0.040 wt % of aluminum (Al), and 0.01 to 0.20 wt % of manganese (Mn), in which the balance is composed of Fe and other inevitable impurities, is prepared. Next, an oriented electrical steel sheet, in which recrystallization has been completed, is prepared by including: manufacturing a hot-rolled sheet by subjecting the steel slab to hot rolling; manufacturing a cold-rolled sheet by subjecting the hot-rolled sheet to cold rolling; obtaining a decarburization-annealed steel sheet by subjecting the cold-rolled sheet to decarburization annealing; and applying an annealing separator onto the decarburization-annealed steel sheet, and carrying out a final annealing. In this case, the slab may be first heated at 1,200° C. or less prior to being subjected to hot rolling, the hot-rolled sheet manufactured after the hot rolling may be annealed, a nitriding treatment may be carried out after the decarburization-annealing or simultaneously with the decarburization-annealing, and the detailed description on the manufacturing conditions will be omitted because these processes are carried out in accordance with typical processes.

In a series of processes of subjecting the slab, which has a composition according to an exemplary embodiment of the present invention to hot rolling-cold rolling-decarburization annealing-final high temperature annealing as described above, it is preferred to control process conditions so as to satisfy the average crystal grain size after the final annealing within a range of 15 to 35 mm.

During the decarburization annealing, the cold-rolled steel slab is introduced into a furnace maintained at 800 to 900° C., and then the dew point temperature and the oxidation capacity are adjusted, and the decarburizing and nitriding treatment and the primary recrystallization annealing may be simultaneously carried out in a mixed gas atmosphere of hydrogen, nitrogen, and ammonia.

Thereafter, a slurry may be manufactured by mixing distilled water with an annealing separator including MgO as a main component, the slurry may be applied onto the decarburization-annealed steel slab, and then the steel slab may be finally annealed.

During the final annealing, a first cracking temperature and a second cracking temperature may be set to 600 to 800° C. and 1,100 to 1,300° C., respectively, and the rate of the temperature rise interval may be set to 10 to 20° C./hr. Further, the final annealing may be carried out in a mixed gas atmosphere of 25 vol % of nitrogen and 75 vol % of hydrogen until the second cracking temperature, and after the second cracking temperature is reached, the steel slab may be maintained in a hydrogen gas atmosphere of 100 vol % for 15 hours, and then may be subjected to furnace cooling.

In order to form an insulation coating on the oriented electrical steel sheet having a controlled average crystal grain size as described above, the surface of the oriented electrical steel sheet is coated with the insulation coating composition for an oriented electrical steel sheet. In this regard, the manufacturing of the insulation coating composition for an oriented electrical steel sheet will be described as follows.

The mesoporous nanoparticles may be manufactured by including: introducing a pore former and a mesoporous nanoparticle precursor into an ethanol solvent, and mixing the resulting mixture; adjusting the pH to 10 to 12 by adding ammonia water into the mixed solution; heating the pH-adjusted solution; and obtaining nanoparticles in which nano-sized pores are formed.

The pore former may be at least one selected from the group consisting of poly(methyl methacrylate) (PMMA), polystyrene, polyethylene oxide), and poly(propylene oxide).

The mesoporous nanoparticle precursor may be at least one selected from the group consisting of tetraethyl orthosilicate, tetramethyl orthosilicate, aluminum trialkoxide, magnesium alkoxide, and titanium tetraalkoxide.

The heating of the pH-adjusted solution may be carried out for 4 to 6 hours within a temperature range of 50 to 70° C. When the solution is heated within the temperature and time ranges, nanoparticles in which nano-sized pores are formed may be produced from the mesoporous nanoparticle precursor.

Further, the metal phosphate may be manufactured by manufacturing an aqueous metal hydroxide solution; introducing phosphoric acid into the manufactured aqueous metal hydroxide solution and mixing the resulting mixture; stirring the mixed solution; and obtaining a compound produced by a chemical reaction of a metal hydroxide and phosphoric acid ($H_3PO_4$).

Meanwhile, the subjecting of the oriented electrical steel sheet, onto which the coating composition for an oriented electrical steel sheet is applied, to a heat treatment may be carried out within a temperature range of 250 to 950° C. If the temperature is more than 950° C., cracks may occur on the produced insulation coating, and if the temperature is less than 250° C., there may occur a problem with corrosion resistance and weatherability because the produced insulation coating is not sufficiently dried, and accordingly, the range is limited as described above.

The subjecting of the oriented electrical steel sheet, onto which the coating composition for an oriented electrical steel sheet is applied, to a heat treatment may be carried out for 30 seconds to 70 seconds. It the time is more than 70 seconds, there may occur a problem in that the productivity is reduced, and if the time is less than 30 seconds, there may occur a problem with corrosion resistance and weatherability, and accordingly, the range is limited as described above.

Detailed Description of the Embodiments

Hereinafter, preferred Examples and Test Examples of the present invention will be described. However, the following Examples are only a preferred Example of the present invention, and the present invention is not limited to the following Examples.

EXAMPLE 1

First, a steel slab containing 3.2 wt % of silicon (Si), 0.03 wt % of aluminum (Al), 0.08 wt % of manganese (Mn), and 0.005 to 0.05 wt % of any one element (hereinafter, referred to as an addition element) selected from boron (B), vanadium (V), or a combination thereof was prepared. In this case, the specific content of the addition element is given according to Preparation Examples 1 to 4 of the following Table 1.

The steel slab was heated at 1,150° C. for 220 minutes, and then hot-rolled to have a thickness of 2.3 mm, thereby manufacturing a hot-rolled sheet.

The hot-rolled sheet was heated to 1,120° C., maintained for 90 seconds by setting the temperature to 920° C., and then rapidly cooled with water and pickled, and cold-rolled to have a thickness of 0.23 mm, thereby manufacturing a cold-rolled sheet.

The cold-rolled sheet was introduced into a furnace maintained at 860° C., and then the dew point temperature and the oxidation capacity were adjusted, and the decarburizing and nitriding treatment and the primary recrystallization annealing were simultaneously carried out in a mixed gas atmosphere of hydrogen, nitrogen, and ammonia, thereby manufacturing a decarburization-annealed steel sheet.

Thereafter, a slurry was manufactured by mixing distilled water with an annealing separator including MgO as a main component, the slurry was applied onto the decarburization-annealed steel slab by using a roll, and the like, and then the steel slab was finally annealed.

During the final annealing, a first cracking temperature and a second cracking temperature were set to 700° C. and 1,200° C., respectively, and the rate of the temperature rise interval was set to 15° C./hr. Further, the final annealing was carried out in a mixed gas atmosphere of 25 vol % of nitrogen and 75 vol % of hydrogen until 1,200° C., and after 1,200° C. was reached, the steel slab was maintained in a hydrogen gas atmosphere of 100 vol % for 15 hours, and then was subjected to furnace cooling.

An oriented electrical steel sheet completely subjected to the final annealing process could be obtained thereby.

Thereafter, an insulation coating composition including 3 wt % of hollow silica particles, 0.7 wt % of silica nanofibers, 5 wt % of mesoporous spherical silica nanoparticles, 40 wt % of colloidal silica nanoparticles, and 51.3 wt % of aluminum phosphate and strontium phosphate, which were mixed at a ratio of 1:1, was applied so as to have an applied amount (weight of the insulation coating per an area of the oriented electrical steel sheet) of 3.3 g/m², and then a heat treatment was each carried out under a temperature condition of 870° C. for 55 seconds.

Each oriented electrical steel sheet having an insulation coating formed could be obtained thereby.

TEST EXAMPLE OF EXAMPLE 1

Evaluation of Magnetic Characteristics and Noise Characteristics

With respect to Example 1, magnetic characteristics and sound characteristics were intended to be evaluated according to the presence and absence of the addition element and the specific content thereof.

Under conditions of 1.7 T and 50 Hz, each oriented electrical steel sheet according to Example 1 was manufactured and was represented by Inventive Examples 1 to 4, magnetic characteristics and noise characteristics for each oriented electrical steel sheet were evaluated, and the results are shown in Table 1.

For comparison, separate oriented electrical steel sheets were manufactured according to Comparative Examples 1 to 5 of Table 1, magnetic characteristics and noise characteristics were evaluated, and the results are also together shown in Table 1.

For the magnetic characteristics of the electrical steel sheet, W17/50 and B8 are typically used as a representative value. W17/50 means a power loss appearing when a magnetic field with a frequency of 50 Hz is magnetized by alternating current until 1.7 Tesla. Here, Tesla is a unit of a magnetic flux density meaning a magnetic flux per a unit area. B8 denotes a value of the density of magnetic flux flowing through an electrical steel sheet when a current amount of 800 A/m flows into a winding wire winding the periphery of the electrical steel sheet.

A general noise is evaluated as a noise [dBA] in an audio band by obtaining a sound pressure (pressure of the air) in a time region in accordance with the International Standard IEC 61672-1, converting the sound pressure into frequency response data, and then reflecting the responsiveness (A-weighted decibels) in the audio band from the frequency response data.

In A noise evaluation method selected in the Examples of the present invention, the general noise is evaluated in the same manner as the International Standard IEC 61672-1, and evaluated as a noise conversion value [dBA] by obtaining the shaking (vibration) data of the electrical steel sheet instead of the sound pressure. For the shaking of the electrical steel sheet, a vibration pattern is measured in a non-contact manner according to the time by utilizing a laser doppler method when a magnetic field with a frequency of 50 Hz is magnetized by alternating current until 1.7 Tesla.

TABLE 1

| Classification | Addition element (wt %) | Crystal grain size (mm) | Magnetic characteristics W17/50 (W/kg) | B8 (T) | Noise (dBA) |
|---|---|---|---|---|---|
| Comparative Example 1 | — | 55 | 0.90 | 1.90 | 59 |
| Comparative Example 2 | 0.001 | 54 | 0.89 | 1.90 | 59 |
| Comparative Example 3 | 0.06 | 13 | 0.89 | 1.90 | 59 |
| Comparative Example 4 | 0.1 | 7 | 1.16 | 1.89 | 66 |
| Comparative Example 5 | 0.2 | 3 | 1.34 | 1.86 | 74 |
| Inventive Example 1 | 0.005 | 35 | 0.85 | 1.91 | 51 |
| Inventive Example 2 | 0.02 | 25 | 0.78 | 1.93 | 46 |
| Inventive Example 3 | 0.04 | 18 | 0.81 | 1.92 | 48 |
| Inventive Example 4 | 0.05 | 15 | 0.82 | 1.91 | 49 |

According to Table 1, it can be confirmed that the magnetic characteristics and noise characteristics of Inventive Examples 1 to 4 are much better than those of Comparative Example 1. It can be deduced that the effect is exhibited as a steel slab including the addition element is subjected to a series of processes of hot rolling-cold rolling-decarburization annealing-final annealing, and the average crystal grain size after the final annealing is micronized within a range of 15 to 35 mm.

However, in Comparative Example 2 in which the content of the addition element is extremely small, crystal grains with a size exceeding the range are produced, and in the case of Comparative Examples 3 to 5 in which the content of the addition element is extremely large, crystal grains with a size less than the range are produced, and accordingly, it can be confirmed that magnetic characteristics and sound characteristics cannot be improved.

Thereby, it can be seen that for the oriented electrical steel sheet containing the addition element, when the crystal grain size after the high temperature annealing is controlled to the range, magnetic characteristics and noise characteristics are excellent.

EXAMPLE 2

(Manufacture of Insulation Coating Composition) As a raw material, a solution in which hollow silica nanoparticles as hollow nanoparticles, alumina ($Al_2O_3$) nanofibers as ceramic nanofibers, mesoporous silica as mesoporous nanoparticles, and a solution in which aluminum phosphate and magnesium phosphate were mixed at a weight ratio of 1:1 as metal phosphate were prepared, and colloidal silica nanoparticles were also prepared.

In this case, the raw materials were mixed with the compositions according to Inventive Examples A1 to A10 recorded in Table 2, thereby manufacturing each insulation coating composition.

(Formation of Insulation Coating for Oriented Electrical Steel Sheet) An oriented electrical steel sheet (300×60 mm) with a thickness of 0.27 mm, containing 3.2 wt % of silicon (Si), 0.02 wt % of aluminum (Al), 0.7 wt % of manganese (Mn), and 0.04 wt % of an addition element, and having a primary coating as a result of a final annealing, was prepared as a sample material. Each insulation coating composition according to Inventive Examples A1 to A10 was applied so as to have an amount of coating composition applied (weight of the insulation coating per an area of the oriented electrical steel sheet) of 2.7 g/m², and then a heat treatment was each carried out under a temperature condition of 920° C. for 45 seconds. Each oriented electrical steel sheet having an insulation coating formed could be obtained thereby.

TEST EXAMPLE FOR EXAMPLE 2

Evaluation of Insulation Properties and Noise Characteristics

For Example 2, the surface quality, insulation properties, and noise characteristics according to the insulation coating composition were intended to be evaluated.

Under the conditions of 1.7 T and 50 Hz, the insulation properties and noise characteristics of the oriented electrical steel sheet according to Example 2 were evaluated, and the results are shown in Table 2.

For comparison, separate oriented electrical steel sheets were manufactured according to Comparative Example A0 and Comparative Examples A1 to A7 of Table 2, the insulation properties and noise characteristics were evaluated under the conditions, and the results are also together shown in Table 2.

The surface quality was obtained by evaluating whether rust occurred on a sample in a 5% NaCl solution at 35° C. for 8 hours, and the cases where the rust occurrence area ratio was 5% or less, 20% or less, 20 to 50%, and 50% or more were marked with excellent, good, slightly poor, and poor, respectively.

For the insulation properties, the upper portion of the coating was measured by utilizing a Franklin measuring device in accordance with the ASTM A717 International Standard.

The noise characteristics were evaluated in the same manner as in the Test Example for Example 1.

TABLE 2

| Classification | Insulation Coating Composition (wt %) | | | | | Surface quality | Insulation properties (mA) | Noise (dBA) |
|---|---|---|---|---|---|---|---|---|
| | Hollow silica | Meso silica | Alumina fibers | Phosphate (Al:Mg) | Colloidal silica | | | |
| Comparative Example A0 | — | — | — | 50 | 50 | Δ | 350 | 66.5 |
| Inventive Example A1 | 0.1 | 2.9 | 3 | 40 | 54 | ⊚ | 110 | 64.1 |
| Inventive Example A2 | 5 | 3 | 1 | 52 | 39 | Δ | 115 | 52.3 |
| Inventive Example A3 | 4 | 0.1 | 2.9 | 35 | 58 | ○ | 154 | 53.6 |
| Inventive Example A4 | 3 | 0.5 | 2.5 | 42 | 52 | ○ | 166 | 57.5 |
| Inventive Example A5 | 1.5 | 2.5 | 0.1 | 48 | 47.9 | ⊚ | 75 | 61.2 |
| Inventive Example A6 | 4.2 | 2.1 | 0.5 | 35 | 58.2 | Δ | 214 | 51.1 |
| Inventive Example A7 | 5 | 2 | 3 | 30 | 60 | ○ | 97 | 53.3 |
| Inventive Example A8 | 2 | 4 | 4 | 60 | 30 | Δ | 85 | 56.5 |
| Inventive Example A9 | 5 | 4 | 3 | 57 | 30 | ○ | 35 | 54.2 |
| Inventive Example A10 | 1.5 | 1.5 | 1 | 36 | 60 | ⊚ | 91 | 59 |
| Comparative Example A1 | 0.05 | 6 | 3.55 | 32.9 | 57.5 | ∇ | 310 | 66.6 |
| Comparative Example A2 | 6 | 2.05 | 0.05 | 36.9 | 55 | X | — | — |
| Comparative Example A3 | 3 | 0.01 | 6 | 35.9 | 55 | ∇ | 450 | 66.5 |

TABLE 2-continued

| Classification | Insulation Coating Composition (wt %) | | | | | Surface quality | Insulation properties (mA) | Noise (dBA) |
|---|---|---|---|---|---|---|---|---|
| | Hollow silica | Meso silica | Alumina fibers | Phosphate (Al:Mg) | Colloidal silica | | | |
| Comparative Example A4 | 3.5 | 5.5 | 4 | 29 | 58 | X | — | — |
| Comparative Example A5 | 2.2 | 3 | 2.2 | 61 | 31.6 | V | 345 | 65.8 |
| Comparative Example A6 | 2 | 3.5 | 1 | 32.5 | 61 | X | — | — |
| Comparative Example A7 | 4 | 5 | 3 | 59 | 29 | V | 470 | 62.9 |

Note)
Determination of Physical Properties/
Excellent: ◎,
Good: ○,
Fair: Δ,
Slightly poor: V,
Poor: X According to Table 2, it can be confirmed that the surface qualities of Inventive Examples A1 to A10 are usually excellent as compared to Comparative Example A0, and insulation properties and noise characteristics were significantly improved. It can be deduced that the effects are achieved by the insulation coating composition further including hollow nanoparticles, ceramic nanofibers, and mesoporous nanoparticles as compared to Comparative Example A0.

However, the contents of the materials need to be appropriately controlled in consideration of the results of Comparative Examples A1 to A7. The need for appropriately controlling the contents of the materials is associated with the roles which the materials play, and according to the Inventive Examples A1 to A10, it is evaluated that it is appropriate for an insulation coating composition to include 0.1 to 7 wt % of hollow nanoparticles, 0.1 to 5 wt % of ceramic nanofibers, 0.1 to 5 wt % of mesoporous nanoparticles, 30 to 60 wt % of colloidal silica nanoparticles, and 30 to 60 wt % of phosphate.

From the evaluation, it can be seen that for the oriented electrical steel sheet containing the addition element, when the components and compositions of the insulation coating are controlled as described above, insulation properties and noise characteristics are excellent.

EXAMPLE 3

(Manufacture of Insulation Coating Composition) The same raw materials as those in Inventive Example A6 were prepared, except that TiO$_2$ nanofibers as ceramic nanofibers and aluminum phosphate as metal phosphate were prepared. As the composition, the raw materials were mixed, thereby manufacturing each insulation coating composition.

(Formation of Insulation Coating of Oriented Electrical Steel Sheet) An oriented electrical steel sheet (600×100 mm) with a thickness of 0.22 mm, containing 3.4 wt % of silicon (Si), 0.04 wt % of aluminum (Al), 0.20 wt % of manganese (Mn), and 0.05 wt % of an addition element, and having a primary coating as a result of a final annealing, was prepared as a sample material. Each insulation coating composition according to Inventive Examples B1 to B5 was applied so as to have an amount of coating composition applied (weight of the insulation coating per an area of the oriented electrical steel sheet) of 2.0 g/m$^2$, and then a heat treatment was each carried out under a temperature condition of 870° C. for 60 seconds. Each oriented electrical steel sheet having an insulation coating formed could be obtained thereby.

TEST EXAMPLE FOR EXAMPLE 3

Evaluation of Noise, Space Factor, and Insulation Properties under Optimal Conditions For Example 3, the composition of the insulation coating exhibiting noise, space factor, and insulation properties under optimal conditions was intended to be evaluated.

Under the conditions of 1.7 T and 50 Hz, the insulation properties, space factor, and noise characteristics of the oriented electrical steel sheet according to Example 3 were evaluated, and the results are shown in Table 3.

For comparison, separate oriented electrical steel sheets were manufactured according to Comparative Examples B1 to B4 of Table 3, the insulation properties, space factor, and noise characteristics were evaluated, and the results are also together shown in Table 3.

Specifically, when each oriented electrical steel sheet was dried at 920° C. for 45 seconds, tensile stress was imparted to each coated surface by a coating agent such that each coated surface was bent in one direction, and the coating tension was evaluated by measuring the bending degree.

Further, each of the insulation properties, space factor, and noise characteristics (under conditions of 1.7 T and 50 Hz) was measured by subjecting the surface of each oriented electrical steel sheet to a laser magnetic domain micronization treatment in a direction at a right angle to the rolling.

TABLE 3

| Classification | Insulation coating characteristics | | | | | |
|---|---|---|---|---|---|---|
| | Coating tension (A, MPa) | Applied amount (B, g/m$^2$) | A/B | Insulation properties (mA) | Space factor (%) | Noise (dBA) |
| Inventive Example B1 | 1 | 5 | 0.20 | 67 | 95.7 | 49.1 |
| Inventive Example B2 | 5 | 2 | 2.50 | 243 | 98.1 | 47 |
| Inventive Example B3 | 2.5 | 4 | 0.63 | 92 | 96.9 | 44.7 |
| Inventive Example B4 | 3.5 | 3 | 1.17 | 115 | 97.5 | 43 |
| Inventive Example B5 | 3 | 3.5 | 0.86 | 117 | 98.0 | 42.5 |

TABLE 3-continued

| | Insulation coating characteristics | | | | | |
|---|---|---|---|---|---|---|
| Classification | Coating tension (A, MPa) | Applied amount (B, g/m²) | A/B | Insulation properties (mA) | Space factor (%) | Noise (dBA) |
| Comparative Example B1 | 0.1 | 5 | 0.02 | 365 | 95.6 | 54 |
| Comparative Example B2 | 6 | 2 | 3.00 | 775 | 97.9 | 51.5 |
| Comparative Example B3 | 0.1 | 0.2 | 0.05 | 954 | 99.0 | 57 |
| Comparative Example B4 | 8.0 | 2.0 | 4.0 | 695 | 98.2 | 50.4 |

According to Table 2, it can be confirmed that the insulation properties and noise characteristics are significantly improved, and the space factor is also usually excellent as compared to Comparative Examples B1 to B4. It can be deduced that the effects are achieved as the coating tension (A) and applied amount (B) of the insulation coating composition are controlled to $0.20 \leq A/B \leq 2.50$ ($2 \leq B \leq 5$).

Furthermore, considering that the noise characteristics are particularly excellent in Inventive Examples B3 and B4, it is evaluated that a much better effect may be obtained by controlling the coating tension (A) and applied amount (B) of the insulation coating composition to $0.63 \leq A/B \leq 1.17$ ($2 \leq B \leq 5$).

From the evaluation, it can be seen that the optimal conditions of the noise, space factor, and insulation characteristics of the oriented electrical steel sheet may be derived by controlling the coating tension of and applied amount of the insulation coating composition.

TEST EXAMPLE

Evaluation of Space Factor and Noise Characteristics of 1000 kVA Transformer

In regard to the oriented electrical steel sheet having an insulation coating formed on the surface thereof by using the composition according to an exemplary embodiment of the present invention, the space factor and noise characteristics were evaluated when a 1,000 kVA transformer was manufactured.

For an oriented electrical steel sheet with a sheet thickness of 0.22 mm, containing 3.2 wt % of silicon (Si), 0.03 wt % of aluminum (Al), 0.12 wt % of manganese (Mn), and 0.03 wt % of the addition element, and having a finally annealed primary coating, insulation coating compositions were selected according to Inventive Examples A2 and A3, and were each produced such that the coating tension (A, MPa) and the applied amount (B, g/m²) of the coating were within a range of $0.63 \leq A/B \leq 1.17$ ($2 \leq B \leq 5$), and a laser magnetic domain micronization treatment was carried out, and then a 1,000 kVA transformer was manufactured, and the results evaluated under conditions of 1.7 T and 60 Hz are shown in Table 4.

In this case, the 1,000 kVA transformer to which the insulation coating composition according to Inventive Example A2 was applied and the 1,000 kVA transformer to which the insulation coating composition according to Inventive Example A3 was applied were marked with Inventive Example C1 and Inventive Example C2, respectively.

For comparison, the same evaluation was carried out for Comparative Example C having A/B of 2.75, and then the result is recorded in Table 4.

TABLE 4

| | Magnetic characteristics | | Space factor | Noise |
|---|---|---|---|---|
| Classification | W17/50 (W/kg) | B8 (T) | (%) | (dBA) |
| Comparative Example C | 0.75 | 1.91 | 97.0 | 56.2 |
| Inventive Example C1 | 0.73 | 1.92 | 97.7 | 49.5 |
| Inventive Example C2 | 0.77 | 1.91 | 97.6 | 51.1 |

According to Table 4, it can be seen that when the coating tension and the applied amount are controlled to $0.63 \leq A/B \leq 1.17$ ($2 \leq B \leq 5$), both the space factor and the noise characteristics of the 1,000 kVA transformer are excellent.

TEST EXAMPLE

Evaluation of Space Factor and Noise Characteristics of 1500 kVA Transformer

In regard to the oriented electrical steel sheet having an insulation coating formed on the surface thereof by using the composition according to an exemplary embodiment of the present invention, the space factor and noise characteristics were evaluated when a 1,000 kVA transformer was manufactured.

For an oriented electrical steel sheet with a sheet thickness of 0.22 mm, containing 3.18 wt % of silicon (Si) and having a finally annealed primary coating, the insulation coating composition according to Inventive Example A3 was selected as the insulation coating composition, was produced so as to have the coating tension (A, MPa) and an amount of coating applied (B, g/m²) to be within a range of $0.63 \leq A/B \leq 1.17$ ($2 \leq B \leq 5$), a laser magnetic domain micronization treatment was carried out, and then a 1,500 kVA transformer was manufactured, the results evaluated under a condition of 60 Hz according to the design magnetic flux density are illustrated in FIG. 1 and Table 5.

In this case, the 1,500 kVA transformer to which the insulation coating composition according to Inventive Example A3 was applied was marked with Inventive Example D1.

For comparison, the same evaluation was carried out for Comparative Example D having A/B of 2.65, and then the result is recorded in FIG. 1 and Table 5.

TABLE 5

| Classification | Magnetic characteristics | | Noise (60 Hz, dBA) | | | | | |
|---|---|---|---|---|---|---|---|---|
| | W17/50(W/kg) | B8(T) | 1.3 T | 1.4 T | 1.5 T | 1.6 T | 1.7 T | 1.8 T |
| Comparative Example D | 0.75 | 1.92 | 53.59 | 57.06 | 59.74 | 62.35 | 66.21 | 70.82 |

TABLE 5-continued

| Classification | Magnetic characteristics | | Noise (60 Hz, dBA) | | | | | |
|---|---|---|---|---|---|---|---|---|
| | W17/50(W/kg) | B8(T) | 1.3 T | 1.4 T | 1.5 T | 1.6 T | 1.7 T | 1.8 T |
| Inventive Example D1 | 0.72 | 1.93 | 50.71 | 53.11 | 55.67 | 57.75 | 60.19 | 63.99 |

According to FIG. 1 and Table 5, it can be seen that when the coating tension and the applied amount are controlled to 0.63≤A/B≤1.17 (2≤B≤5), both the space factor and the noise characteristics of the 1,500 kVA transformer are also excellent.

The present invention is not limited to the Examples, but may be prepared in various forms, and a person with ordinary skill in the art to which the present invention belongs will understand that the present invention can be implemented in another specific form without changing the technical spirit or essential feature of the present invention. Therefore, it should be understood that the above-described Examples are illustrative in all aspects and are not restrictive.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for manufacturing an oriented electrical steel sheet having an insulation coating formed on the surface thereof, the method comprising: preparing an oriented electrical steel sheet comprising 0.005 to 0.05 wt % of any one element selected from boron (B), vanadium (V), or a combination thereof, 2.6 to 4.3 wt % of silicon (Si), 0.020 to 0.040 wt % of aluminum (Al), and 0.01 to 0.20 wt % manganese (Mn), wherein the balance is composed of Fe and other inevitable impurities;
    manufacturing an insulation coating composition for an oriented electrical steel sheet by mixing hollow nanoparticles, ceramic nanofibers, mesoporous nanoparticles, colloidal silica nanoparticles, and metal phosphate;
    applying the insulation coating composition for an oriented electrical steel sheet onto the surface of the oriented electrical steel sheet;
    subjecting the oriented electrical steel sheet, in which the insulation coating composition for an oriented electrical steel sheet is applied onto the surface thereof, to a heat treatment; and
    obtaining an oriented electrical steel sheet having an insulation coating formed on the surface thereof,
    wherein the insulation coating composition for an oriented electrical steel sheet comprises 0.1 to 7 wt % of hollow nanoparticles, 0.1 to 5 wt % of ceramic nanofibers, 0.1 to 5 wt % of mesoporous nanoparticles, 30 to 60 wt % of colloidal silica nanoparticles, and 30 to 60 wt % of metal phosphate.

2. The method of claim 1, wherein:
the prepared oriented electrical steel sheet has an average crystal grain size of 15 to 35 mm.

3. The method of claim 1, wherein:
the preparing of the oriented electrical steel sheet comprising 0.005 to 0.05 wt % of any one element selected from boron (B), vanadium (V), or a combination thereof, 2.6 to 4.3 wt % of silicon (Si):, 0.020 to 0.040 wt % of aluminum (Al), 0.01 to 0.20 wt % of manganese (Mn), wherein the balance is composed of Fe and other inevitable impurities:
preparing a steel slab;
manufacturing a hot-rolled sheet by subjecting the steel slab to hot rolling;
manufacturing a cold-rolled sheet by subjecting the hot-rolled sheet to cold rolling;
obtaining a decarburization-annealed steel sheet by subjecting the cold-rolled sheet to decarburization annealing; and
applying an annealing separator onto the decarburization-annealed steel sheet, and carrying out a final annealing.

4. The method of claim 1, wherein:
in the manufacturing of the insulation coating composition for an oriented electrical steel sheet by mixing hollow nanoparticles, ceramic nanofibers, mesoporous nanoparticles, colloidal silica nanoparticles, and metal phosphate,
the mesoporous nanoparticles are manufactured by comprising:
introducing a pore former and a mesoporous nanoparticle precursor into an ethanol solvent, and mixing the resulting mixture;
adjusting the pH to 10 to 12 by adding ammonia water into the mixed solution;
heating the pH-adjusted solution; and
obtaining nanoparticles in which nano-sized pores are formed.

5. The method of claim 4, wherein:
the pore former is at least one selected from the group consisting of poly(methyl methacrylate) (PMMA), polystyrene, poly(ethylene oxide), and poly(propylene oxide).

6. The method of claim 4, wherein:
the mesoporous nanoparticle precursor is at least one selected from the group consisting of tetraethyl orthosilicate, tetramethyl orthosilicate, aluminum trialkoxide, magnesium alkoxide, and titanium tetraalkoxide.

7. The method of claim 4, wherein:
the heating of the pH-adjusted solution is carried out for 4 to 6 hours within a temperature range of 50 to 70° C.

8. The method of claim 1, wherein:
in the manufacturing of the insulation coating composition for an oriented electrical steel sheet by mixing hollow nanoparticles, ceramic nanofibers, mesoporous nanoparticles, colloidal silica nanoparticles, and metal phosphate,
the metal phosphate is manufactured by comprising:
manufacturing an aqueous metal hydroxide solution;
introducing phosphoric acid into the manufactured aqueous metal hydroxide solution and mixing the resulting mixture;

stirring the mixed solution; and
obtaining a compound produced by a chemical reaction of a metal hydroxide and phosphoric acid ($H_3PO_4$).

* * * * *